United States Patent [19]

Georgas et al.

[11] Patent Number: 5,595,258

[45] Date of Patent: Jan. 21, 1997

[54] ANTI-CAR JACKING SYSTEM

[76] Inventors: Michael J. Georgas, 5143 W. George St., Chicago, Ill. 60641; Kirk L. Nanz, 1717 Carnegie Cir., Tampa, Fla. 33619

[21] Appl. No.: 421,666

[22] Filed: Apr. 12, 1995

[51] Int. Cl.$^6$ .................................................. B60T 17/16
[52] U.S. Cl. ........................ 180/287; 188/353; 303/89
[58] Field of Search ............................. 180/282, 287; 188/353; 303/89; 307/10.2; 251/129.15

[56] References Cited

U.S. PATENT DOCUMENTS

| | | | |
|---|---|---|---|
| 2,826,390 | 3/1958 | Bailey. | |
| 3,641,492 | 2/1972 | Vinokur | 340/65 |
| 3,665,386 | 5/1972 | Dosch | 340/22 |
| 3,790,933 | 2/1974 | Cort | 340/63 |
| 3,800,279 | 3/1974 | Thompson | 340/65 |
| 3,850,260 | 11/1974 | Obermeit | 180/287 |
| 4,196,939 | 4/1980 | Kavis | 303/89 |
| 4,205,300 | 5/1980 | Ho et al. | 340/65 |
| 4,819,050 | 4/1989 | Manzoni | 340/425.5 |
| 4,834,207 | 5/1989 | Havenhill et al. | 180/287 |
| 4,951,776 | 8/1990 | Jeter | 180/287 |
| 4,958,142 | 9/1990 | Sayers | 340/426 |
| 5,086,868 | 2/1992 | Fontaine et al. | 180/287 |
| 5,154,493 | 10/1992 | Futrell et al. | 303/89 |
| 5,298,878 | 3/1994 | Smith | 340/426 |
| 5,392,876 | 2/1995 | Linares | 180/287 |
| 5,477,939 | 12/1995 | Childress | 180/287 |

OTHER PUBLICATIONS

Tricia Serju, "Sounding the Alarm Against Carjackers," *Chicago Sun Times*, Oct. 20, 1994, p. 53.

*Primary Examiner*—Christopher P. Ellis
*Attorney, Agent, or Firm*—Nixon, Hargrave, Devans & Doyle

[57] ABSTRACT

A system for disabling a stolen motor vehicle including a control device and a trigger device. The stolen motor vehicle has a master cylinder housing brake fluid and coupled to brakes by brake lines. The control device controls the flow of brake fluid between the master cylinder and the brakes, initially allowing bidirectional flow of brake fluid. The trigger device triggers the control device to restrict the flow of brake fluid to one direction in response to initiation of the system, tilting of the stolen motor vehicle forward at an angle with respect to ground equal to or greater than a preset angle, and application of the brakes. The trigger device includes a first switch, an operator switch, a motion activated switch, and a brake switch. The first switch is coupled in series between the control device and ground and is initially open. The first switch is operable to activate the control device to restrict the flow of brake fluid to one direction when closed. The operator switch, the motion activated switch, and the brake switch are all initially open and are connected in series between a power source and the first switch. The operator switch, the motion activated switch, and the brake switch close the first switch when they are all closed. The control device includes a solenoid device which is coupled to the power source and has a first position which permits bidirectional flow between the master cylinder and the brakes and a second position which only permits one-way flow to the front brakes. The solenoid device is initially in the first position and is triggered to move to the second position when the first switch closes.

28 Claims, 3 Drawing Sheets

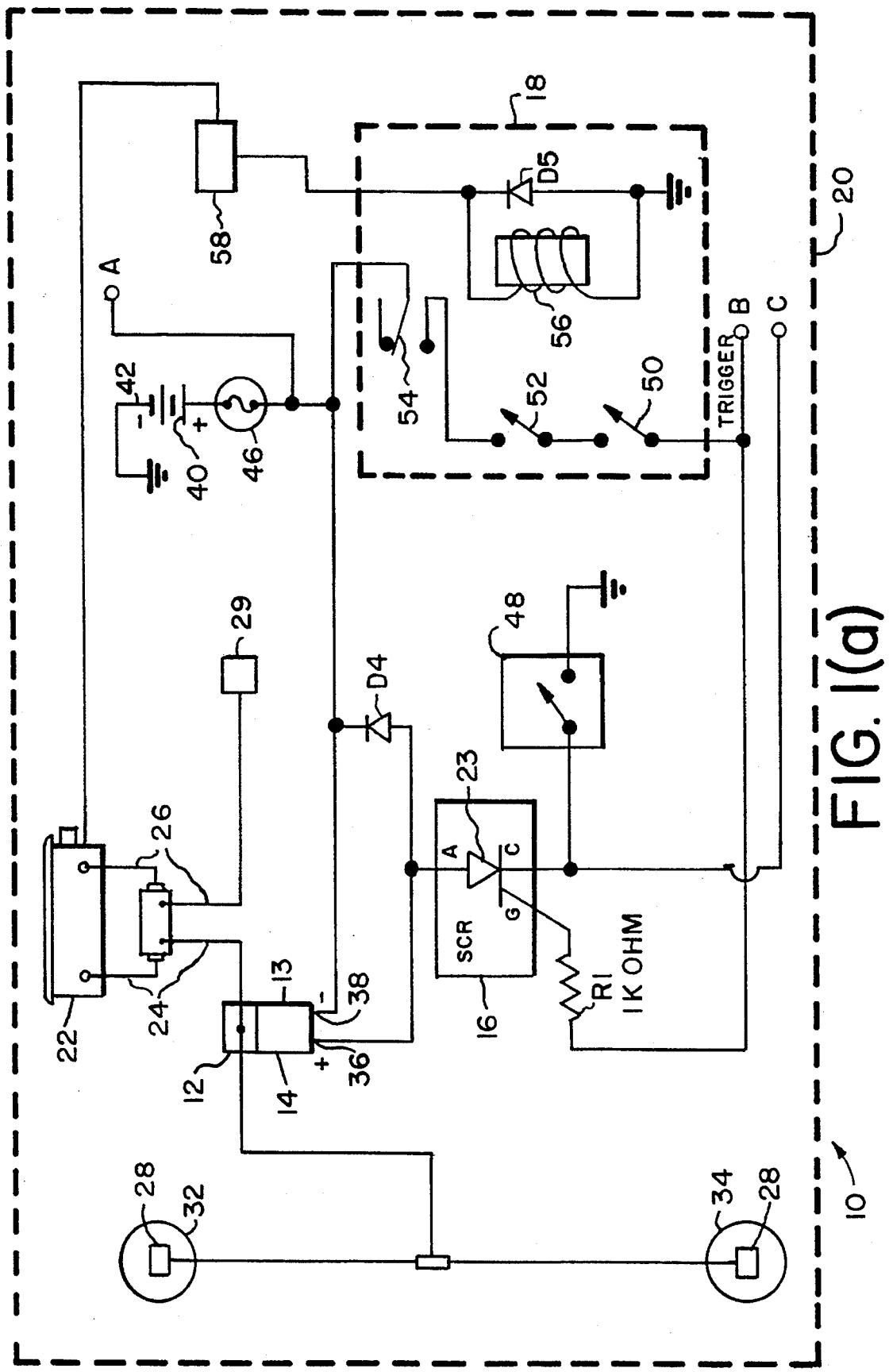
FIG. I(a)

ANTI-CAR JACKING SYSTEM

FIELD OF THE INVENTION

This invention relates to a motor vehicle theft deterrent system, and more particularly to an anti-car jacking system which is designed to disable the motor vehicle once the driver and any passengers are safely out of harms way.

BACKGROUND OF THE INVENTION

Motor vehicle theft has and continues to be a problem for automobile and truck owners. Frequently, motor vehicles which are stolen are seriously damaged, stripped of parts, or resold. The chances of a successful recovery of a stolen motor vehicle diminish dramatically from the time of the theft.

Recently, car jacking has added yet another dimension to the problem of motor vehicle theft. In a car jacking, the thief forcibly removes the driver and any passengers from a motor vehicle and then drives away. Often the typical reaction for a driver and any passenger is to resist the thief's attempts. However, this reaction can prove to be deadly, because the thief will usually fight back injuring or killing the driver and any passengers.

Existing motor vehicle security systems do not adequately address the unique problem of car jackings. These systems do not take into account the safety of the driver and any passengers safety in a car jacking while still providing a means for a quick recovering of the stolen motor vehicle. For example, U.S. Pat. No. 3,641,492 to Vinokur and U.S. Pat. No. 4,834,207 to Havenhill, et al. disclose security systems which are only designed to prevent the theft of a parked motor vehicle. These systems are of little, if any, use in car jackings. Others, such as U.S. Pat. No. 3,790,933 to Cort, U.S. Pat. No. 4,951,776, to Jeter, and U.S. Pat. No. 5,298,878 to Smith disclose security systems which are activated by timers or by the first press of the brake pedal. The timers can expire and the brake pedal can be pressed before the thief has driven any distance from the point of the crime. As a result, the thief can still get out of the motor vehicle and take out his frustrations on the driver and any passengers.

Accordingly, there is a need for a motor vehicle security system which provides the driver and passengers an opportunity to escape safely while still allowing for the quick recovery of the stolen motor vehicle.

SUMMARY OF INVENTION

A system for disabling a stolen motor vehicle including a control device and a trigger device. The stolen motor vehicle has a master cylinder housing brake fluid and coupled to brakes by brake lines. The control device controls the flow of brake fluid between the master cylinder and the brakes, initially allowing bidirectional flow of brake fluid. The trigger device triggers the control device to restrict the flow of brake fluid to one direction in response to initiation of the system, tilting of the stolen motor vehicle forward at an angle with respect to ground equal to or greater than a preset angle, and application of the brakes. The trigger device includes a first switch, an operator switch, a motion activated switch, and a brake switch. The first switch is coupled in series between the control device and ground and is initially open. The first switch is operable to activate the control device to restrict the flow of brake fluid to one direction when closed. The operator switch, the motion activated switch, and the brake switch are all initially open and are connected in series between a power source and the first switch. The operator switch, the motion activated switch, and the brake switch close the first switch when they are all closed. The control device includes a solenoid device which is coupled to the power source and has a first position which permits bidirectional flow between the master cylinder and the brakes and a second position which only permits one-way flow to the front brakes. The solenoid device is initially in the first position and is triggered to move to the second position when the first switch closes.

The system can also be configured to operate on a stolen motor vehicle having an air compressor and an air tank coupled to brakes by brake lines. The system including a second device with an air exhaust opening coupled to the air tank. The second device controlling the amount of air supplied to the brakes from the air tank with the air exhaust. The system also including a triggering mechanism for triggering the second device to open the air exhaust opening to allow air in the air tank and the brake lines to escape in response to initiation of the system, tilting of the stolen motor vehicle forward at a first angle with respect to ground equal to or greater than a predetermined angle, and application of the brakes. When the system is triggered, the vehicles brakes are locked in place.

With the present invention, the success rate of motor vehicle theft and in particular car jacking is substantially reduced. The system disables the motor vehicle shortly after the theft has occurred. As a result, stolen motor vehicles can be more easily recovered and are likely to have suffered less damage. Additionally, the system is designed to disable the motor vehicle only when the driver and any passengers have had an opportunity to get away from the stolen motor vehicle and thief. If the driver is unable to activate the system before being forced to abandon the motor vehicle, the driver can still activate the system remotely by telephone.

DETAILED DESCRIPTION

Figure 1B:
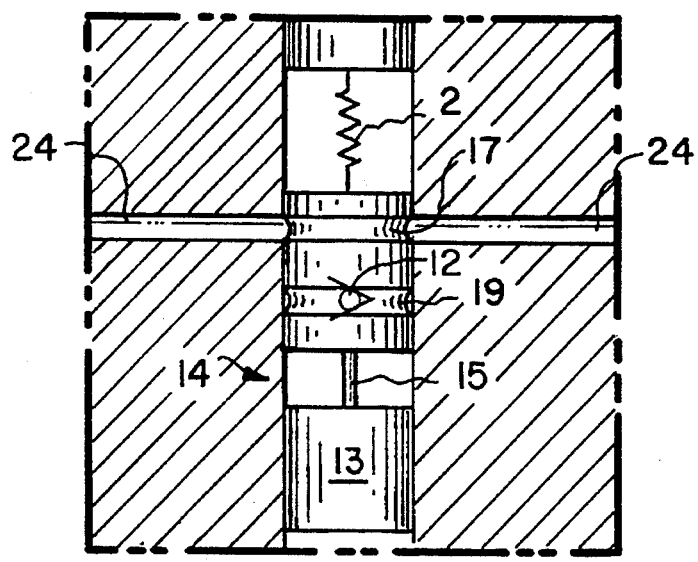
FIG. 1(a) is a partial block and partial schematic diagram of an anti-car jacking system in accordance with the present invention.
FIG. 1 (b) is an enlarged view of a first device with a one-way valve used in the system shown in FIG. 1(a).

One embodiment of an anti-car jacking system 10 in accordance with the present invention is illustrated in FIG. 1(a). Anti-car jacking system 10 includes a first device 14 with a first position which allows bidirectional flow of brake fluid and a second position which only allows one way flow of brake fluid, a switch 16 coupled to first device 14, and a triggering device 18 coupled to switch 16 which is designed to trigger switch 16 only when motor vehicle 20 has travelled a distance from the original crime scene. Anti-car jacking system 10 as illustrated is installed in a motor vehicle 20 with a master cylinder 22 coupled by brake lines 24 and 26 to front brakes 28 and rear brakes 29 and also coupled to a brake pedal 58. With system 10, the driver and any passengers in a motor vehicle 20 which has been car jacked can safety retreat from motor vehicle 20 before system 10 will disable motor vehicle 20. The subsequent disablement of motor vehicle 20 shortly after the theft substantially increases the chances that motor vehicle 20 will be recovered.

Referring to FIG. 1(a), motor vehicle 20 includes master cylinder 22 which houses brake fluid and is connected by brake line 24 to front brakes 28 and brake line 26 to rear brakes 29. A proportioning valve 30 is connected in front and rear brake lines 24 and 26 and allows brake fluid to flow between master cylinder 22 and front and rear brakes 28 and 29. Front brake line 24 is connected to front brakes 28 in the right and left front wheels 32 and 34, respectively. The connections from rear brake line 26 to rear brakes 29 in the right and left rear wheels, respectively, are not shown, but are the same as for the front wheels 32 and 34. A brake pedal 58 is coupled to master cylinder 22 and signals master cylinder 22 to either pump brake fluid to front and rear brakes 28 and 29 or to pull brake fluid back to master cylinder 22.

As described above, system 10 includes first device 14 which can be switched between first and second positions. An enlarged view of one example of first device 14 is shown in FIG. 1(b). In this particular embodiment, first device 14 is a brake solenoid 13 with a rod 15 having a first passage 17 and a second passage 19 with a one-way valve 12 and a magnetic coil (not shown) surrounding rod 15. Although in this particular embodiment: first device 14 is a brake solenoid 13, other mechanisms could be used for first device 14 if desired. The construction and operation of solenoids and relays is well known in the art, as illustrated in U.S. Pat. No. 3,850,260, to Obermeit, U.S. Pat. No. 5,086,868 to Fontaine, et al. and U.S. Pat. No. 4,958,142 to Sayers which are herein incorporated by reference, and thus an extensive discussion of their construction and operation has not been set forth. Brake solenoid 13 includes negative and positive solenoid terminals 36 and 38 as shown in FIG. 1(a).

When first device 14 is in the first position, brake solenoid 13 is not energized. Spring 21 biases rod 15 to couple first passage 17 into front brake line 24 to allow bidirectional flow of brake fluid between master cylinder 22 and front brakes 28. When first device 14 is in the second position, brake solenoid 13 has been energized. Brake solenoid 13 is energized when a voltage is applied across negative and positive solenoid terminals 36 and 38 for brake solenoid 13. The voltage causes current to flow through the coil in brake solenoid 13 generating a magnetic field and causing rod 15 in brake solenoid 13 to move up against spring 21 and to connect passage 19 with one-way valve 12 into front brake line 24 and putting first device 14 into the second position. One way valve 12 blocks brake fluid from returning from front brakes 28 to master cylinder 22 thus locking front brakes 28. Although not shown, a similar arrangement could be incorporated with the rear brake line 26 and rear brakes 29.

Referring back to FIG. 1(a), system 10 also includes a battery 40 with negative and positive battery terminals 42 and 44. Negative battery terminal 42 is coupled to ground and positive battery terminal 44 is coupled to one end of an optional fuse 46. The other end of the fuse 46 is coupled to the negative solenoid terminal 38. System 10 may also include a diode D4 which has an anode coupled to positive solenoid terminal 36 and a cathode coupled to negative solenoid terminal 38. Diode D4 is used to prevent high voltage spikes generated by the magnetic field from brake solenoid 14.

Switch 16 is initially open so that no current can flow through switch 16. In this particular embodiment, switch 16 is a semiconductor controlled rectifier (SCR) 23 although any type of switch which can be triggered closed, such as a voltage switch could be used. Anode A of SCR 23 is coupled to positive solenoid terminal 36 and also to the anode of diode D4 and cathode C of SCR 23 is coupled to one end of a keypad switch 48. The other end of keypad switch 48 is coupled to ground. Keypad switch 48 is normally closed and in this particular embodiment can be open and closed by a key or an electric control system (neither shown), although other types of switches which can be open and closed in other manners could be used. SCR 23 is reset when keypad switch 48 is opened. Gate G of SCR 23 is coupled to one end of a resistor R1. In this particular embodiment resistor R1 has a value of 1K ohms, although resistors of other values could be used. SCR 23 is triggered to permit the flow of current from anode A to cathode C when gate G receives a small control current. Until SCR 23 is triggered, SCR 23 does not permit the flow of any current from anode A to cathode C and thus is open. However, once SCR 23 is triggered SCR 23 permits current to flow to ground regardless of the input at gate G and thus is closed.

Triggering device 18 includes an operator switch 50, a motion activated switch 52 and a brake relay switch 54. In this particular embodiment, all three switches 50, 52, and 54 must be closed to trigger SCR 23 to permit the flow of current, although other arrangements for closing SCR 23 to permit current flow which are related to distance rather than time could be used. For example, an odometer monitor which closed SCR 23 to permit the flow of current after a predetermined number of additional miles on the odometer were detected and after system 10 was activated could be used.

Operator switch 50 is coupled at one end to the other end of resistor R1, is normally open, and can be located anywhere in motor vehicle 20. Operator switch 50 is designed to be engaged by the driver or one of the passengers when a car jacking is suspected. Preferably, operator switch 50 is located on the floor of motor vehicle 20 on the driver's side and can be activated by the driver's foot, although operator switch 50 could be located anywhere on motor vehicle 20.

Motion activated switch 52 which also is normally open is coupled at one end to the other end of operator switch 50. Motion activated switch 52 is positioned in motor vehicle 20 to be at an upward angle of at least five degrees with respect to the ground and preferably is tilted to an angle between five and ten degrees with respect to the ground. Motion activated switch 52 only closes when the front or the nose of motor vehicle 20 drops down towards the ground at an angle equal to or greater than the angle at which motion activated switch 52 is set. Accordingly, when the front brakes 28 and rear brakes in motor vehicle 20 are applied after the motor vehicle 20 has been moving in a forward direction, the front of motor vehicle 20 dips down. When motion activated switch 52 is tilted with motor vehicle 20, the conducting fluid in switch 52 completes the connection. In this particular embodiment, motion activated switch 52 is a mercury switch, although other type of switches 52 could be used.

Brake relay switch 54 which also is normally open is coupled at one end to the other end of motion activated switch 52. The other end of brake relay switch 54 is coupled to the positive battery terminal 44 through fuse 46. A brake coil 56 which has one end coupled to ground and the other end coupled to the brake pedal 58 is adapted to close brake relay switch 54 when energized. As discussed earlier, the operation of relays and solenoids are well known and thus will not be described here again. A diode D5 is coupled across the ends of brake coil 56 and is adapted to prevent high voltage sparks generated by brake coil 56. When the front and rear brakes 28 and 29 are engaged by the driver by pressing brake pedal 58, a voltage source, which is twelve volts in this embodiment, is applied to brake coil 56 energizing coil 56 to close brake relay switch 54.

Anti-car jacking system 10 illustrated in FIG. 1(a) does not interfere with the normal operation of motor vehicle 20 when not engaged. SCR 23 is normally open and blocks the flow of any current to ground. As a result, there is no voltage drop across the negative and positive solenoid terminals 36 and 38 and no current flow through brake solenoid 13. Without the current flow, there is no magnetic field generated in brake solenoid 13 which could push rod 15 to connect passage 19 with one-way valve 12 into from brake line 24 to allow only one way flow from master cylinder 22 to front brakes 28. Instead passage 17 in rod 15 allows brake fluid to flow in either direction in front brake line 28 between the master cylinder 22 and front brakes 28. This enables front brakes 28 to operate in their normal manner in response to signals from brake pedal 58.

When a car jacking occurs, anti-car jacking system 10 is designed to disable motor vehicle 20 only when motor vehicle 20 has travelled a distance away from the original crime scene. System 10 does not rely upon timers to trigger front brakes 28 to lock because timers may expire before motor vehicle 20 has ever been moved. To ensure that motor vehicle 20 can be driven some distance away from the crime scene, system 10 uses a series of switches 50, 52, and 54. Until all three switches 50, 52, and 54 are closed, first device 14 will remain in the first position allowing front brakes 28 and master cylinder 22 to operate normally. When all three switches 50, 52, and 54 are closed, first device 14 is shifted into the second position to put one way valve 12 into front brake line 24 to prevent brake fluid from returning to master cylinder 22 and thus locking front brakes 28 of motor vehicle 20. Again, although system 10 in this particular embodiment disables motor vehicle 20 by locking front brakes 28, system 28 could be designed to disable other parts of motor vehicle 20 such as the ignition instead of front brakes 28. The manner in which switches 50, 52, and 54 are closed is set forth below.

Operator switch 50 is closed by the driver and or any passenger in motor vehicle 20. In this particular embodiment, operator switch 50 is located on the floor of motor vehicle 20 on the driver's side and is closed when the driver steps on operator switch 50. Once operator switch 50 is closed, switch 50 can not be released again from inside motor vehicle 20. Closing operator switch 50 is necessary, but will not cause system 10 to immediately disable motor vehicle 20.

Motion activated switch 52 closes when motor vehicle 20, after being driven in a forward direction, is stopped so that the forward motion causes motor vehicle 20 to tip forward towards the ground at an angle greater then that set for switch 52. In this particular embodiment, motion activated switch is set at an angle of between five and ten degrees to ground.

Brake relay switch 54 closes whenever brake pedal 58 is pressed. Pressing brake pedal 58 couples a power supply of twelve volts (not shown) to brake coil 56. The current passing through brake coil 56 generates a magnetic field which causes brake relay switch 54 to close. As noted earlier, the construction and operation of relay switches is well known.

Closing motion activated switch 52, brake relay switch 54, and operator switch 50 at the same time couples positive battery terminal 44 to the other end of resistor R1. Completing this connection allows a control current to flow from battery 40 through resistor R1 to gate G of SCR 23. The control current at gate G of SCR 23 triggers SCR 23 to permit current to flow from the anode A to the cathode C of SCR 23 and then out to ground through keypad switch 48.

Once current starts flowing through SCR 23, positive solenoid terminal 36 is coupled to ground through SCR 23 and keypad switch 48 and a voltage drop is generated across positive solenoid terminal 36 and negative solenoid terminal 38. Current from battery 40 coupled to negative solenoid terminal 38 flows through brake solenoid 13, out the positive solenoid terminal 36, through SCR 23 and keypad switch 48 and out to ground. The flow of current through brake solenoid 13 generates a magnetic field which causes rod 15 to push against spring 21 to connect second passage 19 with one way valve 12 into front brake line 24. As a result, when the brake pedal 58 is applied, brake fluid from master cylinder 22 passes through front brake line 24 and one way valve 12 and can not return to master cylinder 22. The brake fluid held in by one way valve 12 locks front brakes 28 in place preventing the thief from moving motor vehicle 20 and requiring the thief to abandon motor vehicle 20.

The series connection of operator switch 50, motion activated switch 52, and brake switch 54 help assure that the driver and any passengers are likely to have an opportunity to safely get away from the stolen motor vehicle 20 and thief. Each switch 50, 52, and 54 is needed to prevent system 10 from prematurely shifting first device 14 into the second position and locking front and/or rear brakes 28 and 29.

For example, operator switch 50 is included so that system 10 will not shift first device 14 into the second position until system 10 is activated by closing switch 50. Without operator switch 50, system 10 would disable motor vehicle 20 the first time motion activated switch 52 and brake relay switch 54 are closed.

Motion activated switch 52 is included so that the mere application of front and rear brakes 28 and 29 without some forward motion of motor vehicle 20 occurring will not shift first device 14 into the second position. Typically, a driver will apply front and rear brakes 28 and 29 before putting motor vehicle 20 in gear to drive away. If system 10 did not include motion activated switch 52, when the thief applied brake pedal 54, the brake switch 54 and operator switch 50 would be closed and first device 14 would shift to the second position locking front brakes 28. The thief would not be able to move motor vehicle 20 and would likely get out and take out his frustrations on the driver and any passengers. System 10 avoids this problem with motion activated switch 52 which is only designed to close after motor vehicle 20 moves in a forward direction and then is stopped.

Brake relay switch 54 is included to prevent system 10 from disabling motor vehicle 20 when operator switch 50 is closed and motor vehicle 20 is driven downhill closing motion activated switch 52. With brake relay switch 52, system 10 will not disable motor vehicle 20 until brake relay switch 54 is closed.

Accordingly, system 10 enables the thief to drive away with motor vehicle 20 a short distance before disabling motor vehicle 20. The period of time during which the thief is driving away should provide the driver and any passengers an opportunity to go to a safe location and contact the authorities. Although system 10 allows the thief to drive away with motor vehicle 20, system 10 activates quickly enough after motor vehicle 20 is stolen to prevent the thief from having an opportunity to damage motor vehicle 20, strip parts from motor vehicle 20 or sell the stolen motor vehicle 20.

Figure 2:
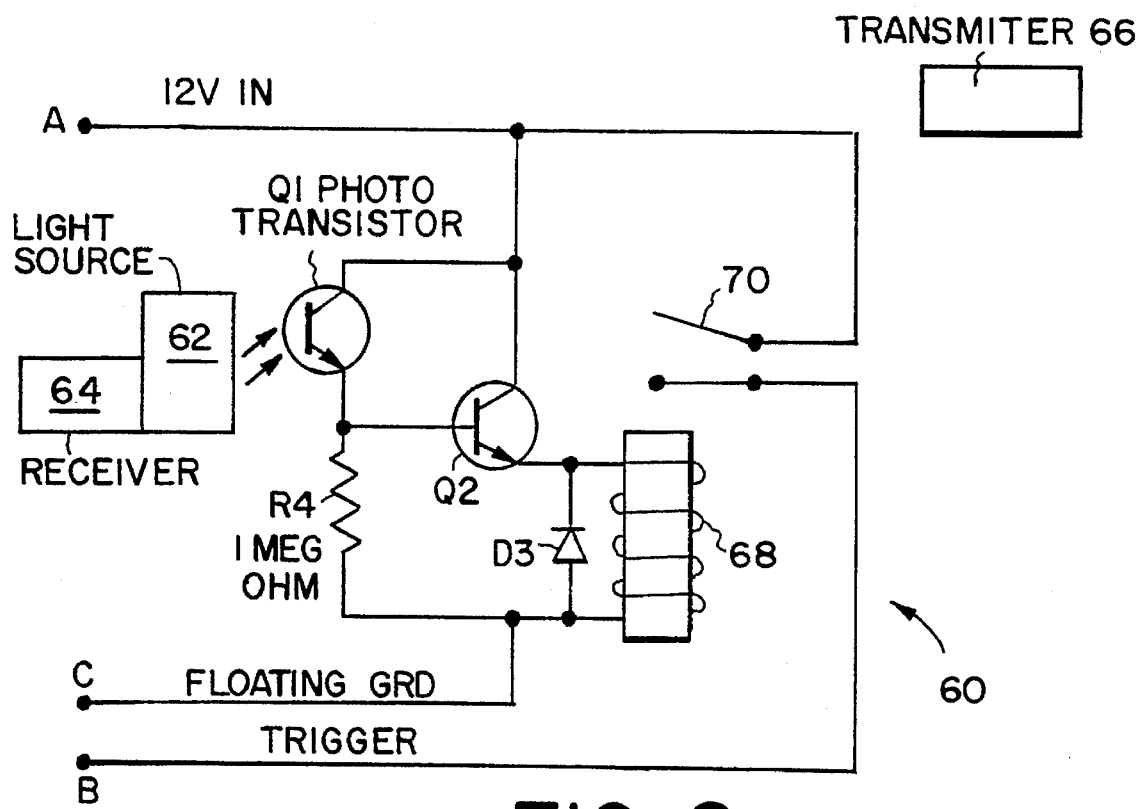
FIG. 2 is partial block and partial schematic diagram of an alternative embodiment for activating the car jacking system shown in FIG. 1(a)

Referring to FIG. 2, an alternative embodiment 60 for actuating anti-car jacking system 10 is illustrated. Positive terminal 44 of battery 40 (shown on FIG. 1) is coupled via point A to the collector of a first phototransistor Q1 and the collector of a second phototransistor Q2. The emitter of the first phototransistor Q1 is coupled to one end of a resistor R4 and the other end of the resistor R4 is coupled to the one end of keypad switch 48 (shown in FIG. 1) via point C. The base of the first phototransistor Q1 is adjacent to a light source 62 which is coupled to a receiver 64. Receiver 64 can be activated remotely by a signal from a transmitter 66. When receiver 64 is activated by the signal, receiver 64 turns light source 62 on. Light from light source 62 shines on the base of the first phototransistor Q1 turning the phototransistor Q1 on. Receiver 64 can be a pager which is activated by a transmitter 64, such as a telephone. The base of phototransistor Q1 is sealed from other light sources other than the one 62 shown to prevent phototransistor Q1 from accidentally being turned on by another source of light.

The base of second phototransistor Q2 is coupled to the emitter of the first phototransistor Q1. The emitter of the second phototransistor Q2 is coupled to one end of a magnetic coil 68 and also to the cathode of a diode D3. The anode of the diode D3 and the other end of the relay are coupled to the one end of the keypad switch 48 [shown in FIG. 1 (a)] via point C. Diode D3 is designed to prevent high voltage spikes produced by the magnetic field from the magnetic coil.

The emitters of the first and second phototransistors Q1 and Q2 are also coupled to one end of a relay switch 70. The other end of relay switch 70 is coupled to the other end of resistor R1 [shown in FIG. 1(a)] via point B. When coil 68 is energized, relay switch 70 closes coupling battery 40 via point B to the gate G of SCR 16 through resistor R1.

The alternative embodiment 60 for actuating anti-car jacking system 10 can be used in a system which has the series connection of operator switch 50, motion activated switch 52, and brake relay switch 54 as described with reference to FIG. 1 (a) or can be used in an anti-car jacking system that does not have the series connection of operator switch 50, motion activated switch 52, and brake relay switch 54 and relies solely on the alternative embodiment 60 to activate the anti-car jacking system. With the alternative embodiment 60, a driver a can remotely activate system 10 to disable motor vehicle 20. The embodiment is particularly helpful if the driver was unable to close operator switch 50 before exiting stolen motor vehicle 20.

If system 10 has not been activated in stolen motor vehicle 20 because the driver did not close operator switch 50 or because system 10 does not have an operator switch 50, then the driver can go to a telephone (not shown) and send a signal to receiver 62 in motor vehicle 20. When receiver 64 receives the signal from the telephone, receiver 64 turns on light source 62. Light from light source 62 turns on first phototransistor Q1 so that current begins to flow from the collector to the emitter in phototransistor Q1. Part of the emitter current goes to the base of the second phototransistor Q2 which turns on phototransistor Q2. Again current begins to flow from the collector to the emitter in phototransistor Q2. The current from the emitter of phototransistor Q2 passes through coil 68. Coil 68 is energized by the current and generates a magnetic field which causes relay switch 70 to close.

When relay switch 70 is closed, then positive battery terminal 44 is coupled to the other end of resistor R1 and a control current flows to gate G of SCR 23. As described in greater detail earlier, SCR 23 closes allowing current to flow through the SCR 23 to ground, brake solenoid 13 is now energized causing brake solenoid 13 to connect second passage 19 with one way valve 12 into front brake line 28 so that brake fluid can only flow from master cylinder 22 to front brakes 28. Valve 12 locks the brake fluid in front brakes 28. As a result, front brakes 28 will be locked when brake pedal is pressed and the thief will be forced to abandon the motor vehicle. With this activation system, the driver will be at a safe point before motor vehicle 20 will be disabled.

Figure 3:
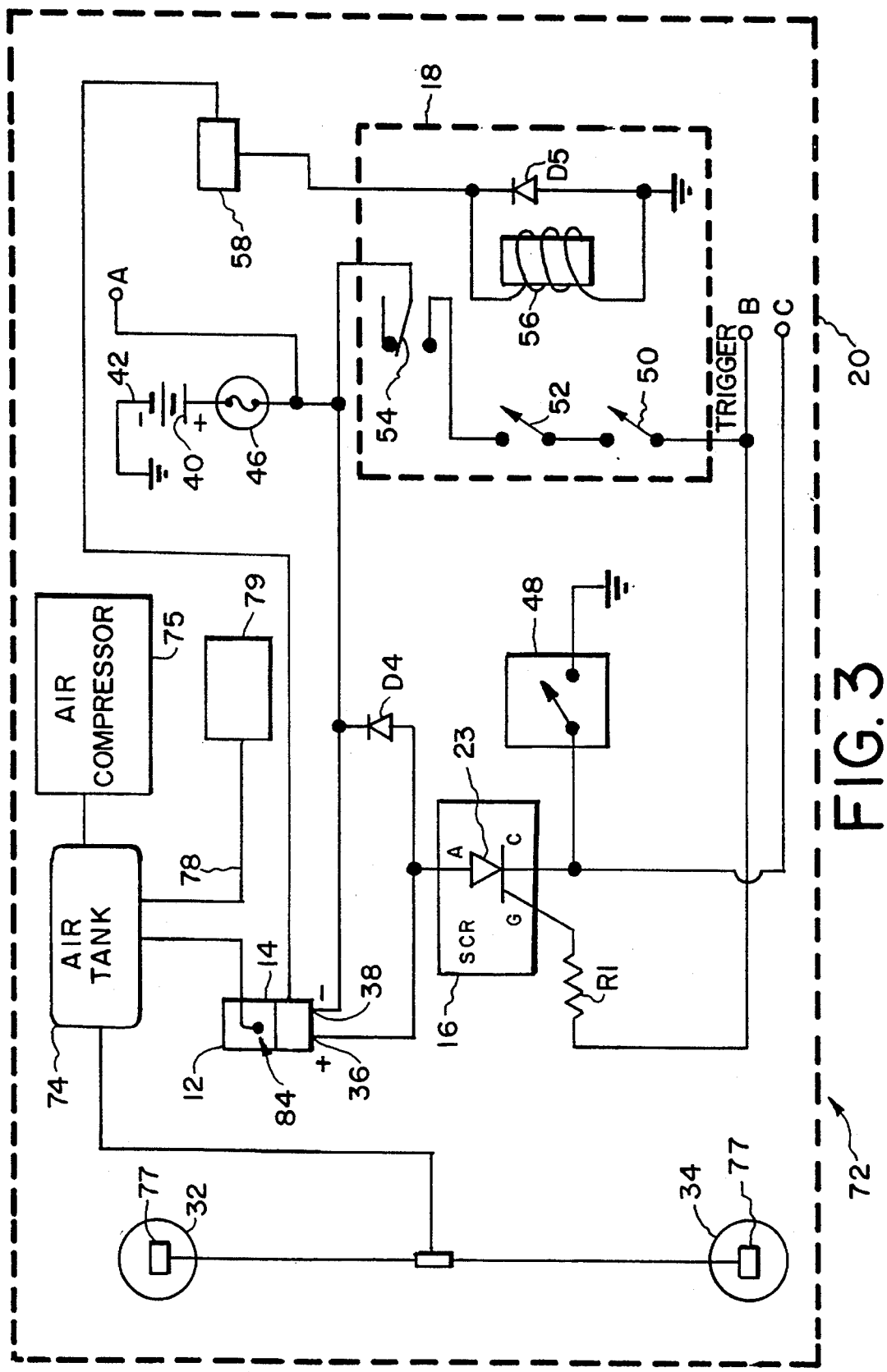
FIG. 3 is a partial block and schematic diagram of a second anti-car jacking system in accordance with the present invention.

Referring to FIG. 3 another embodiment of an anti-car jacking system 72 in accordance with the present invention is illustrated. Corresponding elements in FIG. 3 have numeral designations which correspond to those used in FIGS. 1(a–b) and 2 and will not be described again. Only those portions and elements of the system shown in FIG. 3 which are different from those shown in FIGS. 1(a–b) and 2 are discussed below.

System 72 includes an air tank 74 which is coupled to an air compressor 75 and front and rear air brake lines 76 and 78. Front and rear brake lines 76 and 78 are coupled to front and rear brakes 77 and 79, respectively. Air compressor 75 supplies air or another gas or fluid to air tank 74 which supplies the air to front and rear brakes 77 and 79 via air brake lines 76 and 78. Initially, large springs (not shown) in from and rear brakes 77 and 79 are biased to hold brakes 77 and 79 in place against from and rear wheels of vehicle 20. Air tank 74 is also coupled to second device 80 which has an air exhaust opening 84 which is normally closed. Second device 80 is coupled to brake pedal 58 and when brake pedal is pressed, second device 80 is energized and opens air exhaust opening 84 providing a passage for air in air tank 74 to escape. In this particular embodiment, second device 80 is a solenoid operated valve, although other types of valves could be used if desired.

Basically, system 72 operates as follows: Initially, springs (not shown) in front and rear brakes 77 and 79 are biased against the front and rear wheels of vehicle 20 to hold vehicle 20 in place and air exhaust opening 84 in second device 80 is initially closed. When vehicle 20 is started, air compressor 75 builds up pressure in air tank 74 and in front and rear brake lines 76 and 78. Eventually, air compressor 75 builds up sufficient pressure in air tank 74 and front and rear brake lines 76 and 78 against springs (not shown) in front and rear brakes 77 and 79 to cause front and rear brakes to release front and rear wheels of vehicle 20.

When brake pedal 58 is pressed, it triggers second device 80 to be energized. Energizing second device 80 cause exhaust opening 84 to open and allows air and pressure to be released from air tank 74 and from front and rear brake lines 76 and 78. The reduction in air and pressure in brake lines 76 and 78 against springs in front and rear brakes 77 and 79 causes front and rear brakes 77 and 79 to be applied against front and rear wheels stopping the motion of vehicle 20. When brake pedal 58 is released, second device 80 is no longer energized and second device 80 closes air exhaust opening 84. Closing air exhaust opening 84 allows air compressor 75 to once again build up pressure in air tank 74 and front and rear brake lines 76 and 78 to release front and rear brakes 77 and 79 allowing vehicle 20 to move.

Second device 80 is also coupled to the same triggering mechanisms to prevent car jacking described with respect to in FIGS. 1(a–b) and 2 which can trigger second device 80 and thus will not be described again in detail here. Basically, when second device 80 is energized by one of the previously described car jacking triggering mechanisms, second device 80 is energized opening air exhaust opening 84. Opening air exhaust opening allows air and pressure to escape from air tank 74 and brake lines 76 and 78 and cause springs to press front and rear brakes 77 and 79 against the front and rear wheels of vehicle 20 locking vehicle 20 in place. As noted earlier with first device 14, second device 80 is only triggered by the previously described car jacking triggering mechanisms when all three switches 50, 52, and 54 are closed or when remote triggering system, described earlier with reference to FIG. 2, is signalled by transmitter 66. As with system 10 described in FIGS. 1(a–b), with system 72 the driver and any passengers in vehicle 20 which has been car jacked can safety retreat from vehicle 20 before system 72 will disable vehicle 20. The subsequent disablement of vehicle 20 shortly after the theft substantially increases the chances that vehicle 20 will be recovered.

Having thus described the basic concept of the invention, it will be readily apparent to those skilled in the art that the foregoing detailed disclosure is limited to be presented by way of example only, and is not limiting. Various alterations, improvements and modifications will occur and are intended to those skilled in the art, though not expressly stated herein. These modifications, alterations and improvements are intended to be suggested hereby, and are within the spirit and scope of the invention. Accordingly, the invention is limited only by the following claims and equivalents thereto.

What is claimed is:

1. A system for disabling a stolen motor vehicle, the stolen motor vehicle having a master cylinder housing brake fluid and coupled to brakes by brake lines, said system comprising:

means for controlling the flow of brake fluid between the master cylinder and the brakes, said means for controlling initially allowing bidirectional flow of brake fluid; and first means for triggering said means for controlling to restrict the flow of brake fluid to one direction, said first means being activated in response to: initiation of the system, tilting of the stolen motor vehicle forward at a first angle with respect to ground equal to or greater than a predetermined angle, and application of the brakes.

2. The system as set forth in claim 1 wherein said first means for triggering comprises:

a first switch coupled in series between said means for controlling and ground, said first switch being initially open and being operable to activate said means for controlling to restrict the flow of brake fluid to one direction when closed; and an operator switch, a motion activated switch, and a brake switch which are all initially open and are connected in series between a power source and said first switch, said operator switch, said motion activated switch, and said brake switch closing said first switch when said operator switch, said motion activated switch, and said brake switch are closed in response to: the initiation of the system, the tilting of the stolen motor vehicle at the first angle with respect to ground equal to or greater than the predetermined angle, and the application of the brakes.

3. The system as set forth in claim 2 wherein said means for controlling comprises a solenoid device coupled to the power source, said solenoid device having a first position which permits bidirectional flow between the master cylinder and the brakes and a second position which only permits one-way flow to the front brakes, said solenoid device initially in said first position and being triggered to move to said second position when said first switch closes coupling said solenoid device to ground through said first switch.

4. The system as set forth in claim 3 further comprising a keypad switch coupled in series between said first switch and ground, said keypad switch adapted to open said first switch when said keypad switch is opened to reset the system.

5. The system as set forth in claim 4 wherein said first switch is a semiconductor controlled rectifier.

6. The system as set forth in claim 2 wherein said motion activated switch is positioned to be at an angle of at least five degrees with respect to ground.

7. The system as set forth in claim 6 wherein said motion activated switch is a mercury switch.

8. The system as set forth in claim 1 further comprising second means for triggering said means for controlling to restrict the flow of brake fluid to one direction in response to a remotely transmitted first signal.

9. The system as set forth in claim 8 wherein said second means for triggering comprises:

a first switch coupled in series between said means for controlling and ground, said first switch being initially open and being operable to activate said means for controlling to restrict the flow of brake fluid to one direction when closed; and a second device coupled between said first switch and the power source and adapted to be turned on by the remotely transmitted first signal, said second device closing said first switch when said second device is turned on.

10. The system as set forth in claim 9 wherein, said second device comprises at least one phototransistor, a light source positioned to shine light on said phototransistor to turn said phototransistor on, a receiver coupled to said light source and adapted to turn said light source on when the remotely transmitted first signal is received, said phototransistor coupled to a magnetic coil which is energized when said phototransistor is on to close a relay switch coupled between the power source and said current switch.

11. A system for disabling a stolen motor vehicle, the stolen motor vehicle having a master cylinder housing brake fluid and coupled to brakes by brake lines, said system comprising:

a first device coupled to a power source and having a first position which permits bidirectional flow between the master cylinder and the brakes and a second position which only permits one-way flow to the front brakes, said first device being initially in said first position;

a first switch coupled in series between said first device and ground, said first switch being initially open and being operable to activate said first device to switch from said first position to said second position when said first switch is closed; and an operator switch and a motion activated switch which are both normally open and are connected in series with the power source and said first switch, said operator switch and said motion activated switch closing said first switch when both said operator switch and said motion activated switch are closed.

12. The system as set forth in claim 11 further comprising a brake switch coupled in series with said operator switch and said motion activating switch, said operator switch, said motion activated switch, and said brake switch closing said first switch when said operator switch, said motion actuated switch, and said brake switch are all closed.

13. The system as set forth in claim 12 further comprising a keypad switch coupled in series between said first switch and ground, said keypad switch adapted to open said first switch when opened to reset the system.

14. The system as set forth in claim 13 wherein said first switch is a semiconductor controlled rectifier and said first device is a solenoid device.

15. The system as set forth in claim 11 further comprising a second device coupled between said first switch and the power source and adapted to be turned on by a remotely transmitted signal, said second device closing said first switch when turned on.

16. The system as set forth in claim 15 wherein said second device comprises at least one phototransistor, a light source positioned to shine light on said phototransistor to turn said phototransistor on, a receiver coupled to said light source and adapted to turn said light source on when the remotely transmitted signal is received, said phototransistor coupled to a magnetic coil which is energized when said phototransistor is on to close a relay switch coupled between the power source and said first switch.

17. A method for disabling a stolen motor vehicle, the stolen motor vehicle having a master cylinder housing brake fluid and coupled to brakes by brake lines, said method comprising the steps of:

monitoring when the system is turned on;

monitoring when the stolen motor vehicle is tilted forward at an angle with respect to ground equal to or greater than a preset angle;

monitoring when the brakes are applied;

restricting the flow of brake fluid between the master cylinder and the brakes to one direction when the system monitors that the system has been turned on, the stolen motor vehicle has been tilted at a first angle with respect to ground equal to or greater than a predetermined angle, and the brakes have been applied.

18. The method as set forth in claim 17 further comprising the steps of:

transmitting a first signal to the system to restrict the flow of brake fluid between the master cylinder and the brakes to one direction; and restricting the flow of brake fluid between the master cylinder and the brakes in response to the first signal.

19. A system for disabling a stolen motor vehicle, the stolen motor vehicle having an air compressor coupled to an air tank holding air, the air tank coupled to brakes by brake lines, said system comprising:

means for controlling the amount of air supplied to the brakes from the air tank, said means for controlling including an air exhaust opening which is initially closed; and first means for triggering said means for controlling to open said air exhaust opening to allow air in the air tank and the brake lines to escape in response to: initiation of the system, tilting of the stolen motor vehicle forward at a first angle with respect to ground equal to or greater than a predetermined angle, and application of the brakes.

20. The system as set forth in claim 19 wherein said first means for triggering comprises:

a first switch coupled in series between said means for controlling and ground, said first switch being initially open and being operable to activate said means for controlling to open said air exhaust opening; and an operator switch, a motion activated switch, and a brake switch which are all initially open and are connected in series between a power source and said first switch, said operator switch, said motion activated switch, and said brake switch closing said first switch when said operator switch, said motion activated switch, and said brake switch are closed in response to: the initiation of the system, the tilting of the stolen motor vehicle at the first angle with respect to ground equal to or greater than the predetermined angle, and the application of the brakes.

21. The system as set forth in claim 20 wherein said means for controlling comprises a solenoid device coupled to the power source, said solenoid device having a first position in which said air exhaust opening is closed and a second position in which said air exhaust opening is open, said solenoid device initially in said first position and being triggered to move to said second position when said first switch closes coupling said solenoid device to ground through said first switch.

22. The system as set forth in claim 21 further comprising a keypad switch coupled in series between said first switch and ground, said keypad switch adapted to open said first switch when said keypad switch is opened to reset the system.

23. The system as set forth in claim 22 wherein said first switch is a semiconductor controlled rectifier.

24. The system as set forth in claim 20 wherein said motion activated switch is positioned to be at an angle of at least five degrees with respect to ground.

25. The system as set forth in claim 24 wherein said motion activated switch is a mercury switch.

26. The system as set forth in claim 19 further comprising second means for triggering said means for controlling to restrict the flow of brake fluid to one direction in response to a remotely transmitted first signal.

27. The system as set forth in claim 26 wherein said second means for triggering comprises:

a first switch coupled in series between said means for controlling and ground, said first switch being initially open and being operable to activate said means for controlling to restrict the flow of brake fluid to one direction when closed; and a second device coupled between said first switch and the power source and adapted to be turned on by the remotely transmitted first signal, said second device closing said first switch when said second device is turned on.

28. The system as set forth in claim 27 wherein, said second device comprises at least one phototransistor, a light source positioned to shine light on said phototransistor to turn said phototransistor on, a receiver coupled to said light source and adapted to turn said light source on when the remotely transmitted first signal is received, said phototransistor coupled to a magnetic coil which is energized when said phototransistor is on to close a relay switch coupled between the power source and said current switch.

* * * * *